(12) United States Patent
Peng et al.

(10) Patent No.: US 9,670,353 B2
(45) Date of Patent: Jun. 6, 2017

(54) THERMOPLASTIC VULCANIZATE WITH CROSSLINKED OLEFIN BLOCK COPOLYMER

(71) Applicant: Dow Global Technologies LLC, Midland, MI (US)

(72) Inventors: Shuwen Peng, Shanghai (CN); Yabin Sun, Shanghai (CN); Mahalia Soediono, Shanghai (CN); Shih-Yaw Lai, Marlboro, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/651,967

(22) PCT Filed: Dec. 31, 2012

(86) PCT No.: PCT/CN2012/087961
§ 371 (c)(1),
(2) Date: Jun. 12, 2015

(87) PCT Pub. No.: WO2014/101154
PCT Pub. Date: Jul. 3, 2014

(65) Prior Publication Data
US 2015/0299455 A1  Oct. 22, 2015

(51) Int. Cl.
*C08L 53/00* (2006.01)
*C08F 8/00* (2006.01)
*C08L 23/00* (2006.01)

(52) U.S. Cl.
CPC ........... *C08L 53/00* (2013.01); *C08L 2205/03* (2013.01); *C08L 2312/00* (2013.01)

(58) Field of Classification Search
None
See application file for complete search history.

(56) References Cited

U.S. PATENT DOCUMENTS

| | | |
|---|---|---|
| 4,798,081 A | 1/1989 | Hazlitt et al. |
| 5,504,172 A | 4/1996 | Imuta et al. |
| 5,852,100 A | 12/1998 | Sadatoshi et al. |
| 6,087,443 A | 7/2000 | Sadatoshi et al. |
| 6,184,290 B1 | 2/2001 | Ahmed et al. |
| 6,525,157 B2 | 2/2003 | Cozewith et al. |
| 6,960,635 B2 | 11/2005 | Stevens et al. |
| 7,465,769 B2 | 12/2008 | Esseghir et al. |
| 7,579,408 B2 | 8/2009 | Walton |
| 7,608,668 B2 | 10/2009 | Li Pi Shan et al. |
| 7,622,529 B2 | 11/2009 | Walton et al. |
| 7,858,706 B2 | 12/2010 | Arriola et al. |
| 2006/0199887 A1 | 9/2006 | Liang et al. |
| 2006/0199905 A1 | 9/2006 | Hughes et al. |
| 2006/0199910 A1 | 9/2006 | Walton et al. |
| 2006/0199911 A1 | 9/2006 | Markovich et al. |
| 2006/0281868 A1* | 12/2006 | Sudhin .............. C08L 23/08 525/240 |
| 2007/0010616 A1 | 1/2007 | Kapur et al. |
| 2007/0167578 A1 | 7/2007 | Arriola et al. |
| 2008/0085973 A1 | 4/2008 | Esseghir et al. |
| 2011/0118416 A1 | 5/2011 | Arriola et al. |
| 2011/0124818 A1 | 5/2011 | Arriola et al. |
| 2011/0135916 A1 | 6/2011 | Lu |
| 2011/0166263 A1 | 7/2011 | Rikhoff et al. |
| 2012/0070601 A1 | 3/2012 | Qian et al. |
| 2012/0277365 A1 | 11/2012 | Mercier et al. |
| 2013/0030092 A1 | 1/2013 | Arriola et al. |
| 2014/0249286 A1 | 9/2014 | Arriola et al. |

FOREIGN PATENT DOCUMENTS

WO   00/01745 A1   1/2000

OTHER PUBLICATIONS

Dobrynin, J. Chem. Phys, 107(21), Dec. 1, 1997, pp. 9234-9238.
Potemkin et al., Physical Review E., 57(6), (1998), pp. 6902-6912.
Wild, et al., J. Polym. Sci., 20, (1982), pp. 441-455.
Williams, Polym. Let., 6, pp. 621-624, (1968).

* cited by examiner

*Primary Examiner* — Susannah Chung
*Assistant Examiner* — Robert T Butcher
(74) *Attorney, Agent, or Firm* — Husch Blackwell LLP

(57) ABSTRACT

The present disclosure provides a composition comprising or obtained from a reaction mixture comprising a first propylene-based polymer, an olefin block copolymer, and a cure component. The cure component comprises (i) a second propylene/α-olefin copolymer, (ii) a scorch retardant, and (iii) a crosslinking agent.

3 Claims, No Drawings

THERMOPLASTIC VULCANIZATE WITH CROSSLINKED OLEFIN BLOCK COPOLYMER

FIELD

The present disclosure is directed to thermoplastic vulcanizate compositions.

BACKGROUND

Known are thermoplastic vulcanizates (TPV). ATPV is a polymeric composition having a thermoplastic matrix through which a thermoset elastomer is distributed. A "thermoset elastomer" is an elastomer irreversibly solidified or "set" when heated, generally due to an irreversible crosslinking reaction. Common thermoset elastomers include crosslinked ethylene-propylene monomer (EPM) rubber and crosslinked ethylene-propylene-diene monomer (EPDM) rubber.

Commercial TPVs are typically produced by dynamically vulcanizing (that is, crosslinking with a peroxide, phenolic resin or sulfur cure system, while vigorously mixing), an elastomer in a thermoplastic matrix. Examples of TPVs include EPM rubber thermoset in a crystalline polypropylene matrix.

The art recognizes the need for TPV's with improved properties such as greater heat resistance, improved low temperature performance, and improved elongation.

SUMMARY

The present disclosure is directed to TPV compositions with crosslinked olefin block copolymer as the thermoset elastomer. The present TPV compositions exhibit improved heat resistance, improved low temperature performance, and improved elongation compared to conventional TPV.

In an embodiment, the present disclosure provides a composition comprising or obtained from a reaction mixture comprising a first propylene-based polymer, an olefin block copolymer, and a cure component. The cure component comprises (i) a second propylene/α-olefin copolymer, (ii) a scorch retardant, and (iii) a crosslinking agent.

The present disclosure also provides a thermoplastic vulcanizate composition. In an embodiment, the thermoplastic vulcanizate composition comprises a continuous phase comprising a first propylene-based polymer. A discontinuous phase is dispersed in the continuous phase. The discontinuous phase comprises a crosslinked olefin block copolymer.

DETAILED DESCRIPTION

1. Composition

The present disclosure provides a composition. In an embodiment, the composition includes a first propylene-based polymer, an olefin block copolymer, and a cure component. The cure component includes a second propylene-based polymer that is a propylene/α-olefin copolymer, a scorch retardant, and a crosslinking agent. The composition also includes the reaction mixture of the first propylene-based polymer, the olefin block copolymer, and the cure component.

A. First Propylene-Based Polymer

The composition includes a first propylene-based polymer. The first propylene-based polymer may be a propylene homopolymer or a propylene/α-olefin copolymer. In an embodiment, the first propylene-based polymer is a random propylene/α-olefin copolymer (or first random propylene/α-olefin). The random propylene/α-olefin copolymer is a copolymer in which the monomer is randomly distributed across the polymer chain and includes a majority amount of mole % units derived from propylene, with the remainder of the units derived from units of at least one α-olefin. The presence of the comonomer in the copolymer changes the crystallinity, and thus the physical properties, of the propylene. The α-olefin component of the random propylene copolymer may be ethylene (ethylene is considered an α-olefin for purposes of this disclosure) or a $C_{4-20}$ linear, branched or cyclic α-olefin. Nonlimiting examples of suitable $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins may also contain a cyclic structure such as cyclohexene or cyclopentene, resulting in an α-olefin such as 3-cyclohexyl-1-propene (allyl cyclohexane) and vinyl cyclohexane.

In an embodiment, the first propylene-based polymer is a random propylene/α-olefin copolymer having a density from 0.85 g/cc to 0.95 g/cc and a melt flow rate (MFR) from 2 g/10 min to 25 g/10 min.

In an embodiment, the first propylene-based polymer is a first random propylene/ethylene copolymer comprising 15 weight percent units derived from ethylene, the copolymer having a density of 0.9 $g/cm^3$, a molecular weight of about 170,000, and a MFR of 12 g/10 min. at 230° C. under a load of 2.16 kg. A nonlimiting example of the first random propylene/ethylene copolymer is C715-12 available from The Dow Chemical Company, Midland, Mich., USA.

The first propylene-based polymer may comprise two or more embodiments disclosed herein.

B. Olefin Block Copolymer

The composition includes an olefin block copolymer. An "olefin block copolymer (or "OBC"), as used herein, is a multi-block or segmented copolymer and includes two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block copolymer is characterized by unique distributions of polydispersity index (PDI or $M_w/M_n$), block length distribution, and/or block number distribution due to the unique process making of the copolymers. More specifically, when produced in a continuous process, embodiments of the OBC may possess a PDI ranging from about 1.7 to about 8; or from about 1.7 to about 3.5; or from about 1.7 to about 2.5; and from about 1.8 to about 2.5; or from about 1.8 to about 2.1. When produced in a batch or semi-batch process, embodiments of the OBC may possess a PDI ranging from about 1.0 to about 2.9; or from about 1.3 to about 2.5; or from about 1.4 to about 2.0; or from about 1.4 to about 1.8.

In an embodiment, the OBC is an ethylene/α-olefin multi-block copolymer. The ethylene/α-olefin multi-block copolymer comprises a majority mole fraction of units derived from ethylene, the ethylene comprising at least 50 mol %, or at least 60 mol %, or at least 70 mol %, or at least 80 mol % with the remainder of the multi-block copolymer comprising the comonomer. The ethylene/α-olefin multi-block copolymer further includes ethylene and the co-polymerizable α-olefin comonomer in polymerized form, characterized by multiple (i.e., two or more) blocks or segments of two or more polymerized monomer units differing in chemical or physical properties (block interpolymer), and is a multi-block copolymer. In some embodiments, the multi-block copolymer may be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. The A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all, or substantially all, ethylene.

The "soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI fitting a Schultz-Flory distribution rather than a Poisson distribution. The present OBC is produced by the polymerization process described in WO 2005/090427 and U.S. Ser. No. 11/376,835 which results in a product having both a polydisperse block distribution as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the ethylene/α-olefin multi-block copolymer is defined as having (A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2$$

wherein d is from 0.866 g/cc, or 0.87 g/cc to 0.89 g/cc, or 0.91 g/cc, or 0.93 g/cc, and Tm is from 113° C., or 115° C., or 117° C., or 118° C. to 120° C., or 121° C., or 125° C.

In an embodiment, the ethylene/α-olefin multi-block copolymer is defined as having (B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T > 48°\text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.

In an embodiment, the ethylene/α-olefin multi-block copolymer is defined as having (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d)$$

In an embodiment, the ethylene/α-olefin multi-block copolymer is defined as having (D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer.

In an embodiment, the ethylene/α-olefin multi-block copolymer is defined as having (E) has a storage modulus at 25° C., G'(25° C.), and a storage modulus at 100° C., G'(100° C.), wherein the ratio of G'(25° C.) to G'(100° C.) is in the range of about 1:1 to about 9:1.

In an embodiment, the ethylene/α-olefin multi-block copolymer is defined as having (F) molecular fraction which elutes between 40° C. and 130° C. when fractionated using TREF, characterized in that the fraction has a block index of at least 0.5 and up to about 1 and a molecular weight distribution, Mw/Mn, greater than about 1.3.

In an embodiment, the ethylene/α-olefin multi-block copolymer is defined as having (G) average block index greater than zero and up to about 1.0 and a molecular weight distribution, Mw/Mn greater than about 1.3.

The ethylene/α-olefin multi-block copolymer may have any combination of properties (A)-(G) set forth above.

Nonlimiting examples of suitable comonomer include straight-chain/branched α-olefin of 3 to 30 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer in the ethylene/α-olefin multi-block copolymer is selected from propylene, octene, butene and hexene.

In an embodiment, the ethylene/α-olefin multi-block interpolymer is an ethylene/octene multi-block copolymer.

The OBC composition may comprise two or more embodiments discussed herein.

C. Cure Component

The present composition includes the cure component. The cure component includes the second propylene-based polymer that is a propylene/α-olefin copolymer (second propylene/α-olefin copolymer), a scorch retardant; and a crosslinking agent.

i. Second Propylene/α-Olefin Copolymer

The cure component includes a second propylene-based polymer that is a propylene/α-olefin copolymer ("a second propylene/α-olefin copolymer"). The second propylene-based polymer is different than the first propylene-based polymer described above. In other words, the second propylene/α-olefin copolymer has one or more properties different than the previously described first propylene-based polymer such as: density, melt flow rate, isotacticity, crystallinity, and/or catalyst system. Nonlimiting examples of suitable comonomers for the propylene/α-olefin copolymer include $C_2$, and $C_4$ to $C_{10}$ α-olefin, for example, $C_2$, $C_4$, $C_6$ and $C_8$ α-olefins. The second propylene/α-olefin copolymer contains from 1 wt % to 40 wt % by weight of α-olefin comonomer.

In an embodiment, the second propylene/α-olefin copolymer of the cure component is a propylene/ethylene copolymer (or second propylene/ethylene copolymer). In a further embodiment, the second propylene/ethylene copolymer is a random propylene/ethylene copolymer.

The second propylene/ethylene copolymer is characterized as having substantially isotactic propylene sequences. "Substantially isotactic propylene sequences" means the sequences have an isotactic triad (mm) measured by $^{13}C$ NMR of greater than 0.85, or greater than 0.90, or greater than 0.92, or greater than 0.93. Isotactic triads are known in the art and described in, for example, U.S. Pat. No. 5,504,172 and WO 2000/01745, which refer to the isotactic sequence in terms of a triad unit in the copolymer molecular chain determined by $^{13}CNMR$ spectra.

The second propylene/ethylene copolymer has a melt flow rate (MFR) in the range of from 0.1 to 25 g/10 min., measured in accordance with ASTM D-1238 (at 230° C./2.16 Kg). All individual values and subranges from 0.1 to 25 g/10 min. are included and disclosed herein; for example, the MFR can be from a lower limit of 0.1, 0.2, or 0.5, to an upper limit of 25, 15, 10, 8, or 5, g/10 min. For example, the second propylene/ethylene copolymer may have a MFR in the range of 0.1 to 10, or in the alternative, 0.2 to 10, g/10 min.

The second propylene/ethylene copolymer has a crystallinity in the range of from at least 1 to 30 wt % (a heat of fusion of at least 2 to less than 50 Joules/gram (J/g)), all individual values and subranges thereof being included and disclosed herein. For example, the crystallinity can be from a lower limit of 1, 2.5, or 3, wt % (respectively, at least 2, 4, or 5 J/g) to an upper limit of 30, 24, 15 or 7, wt % (respectively, less than 50, 40, 24.8 or 11 J/g). For example, the second propylene/ethylene copolymer may have a crystallinity in the range of from at least 1 to 24, 15, 7, or 5, wt % (respectively, at least 2 to less than 40, 24.8, 11, or 8.3 J/g). Crystallinity is measured via DSC method, as described above. The second propylene/ethylene copolymer comprises units derived from propylene and polymeric units derived from ethylene comonomer and optional $C_4$-$C_{10}$ α-olefin. Exemplary comonomers are $C_2$, and $C_4$ to $C_{10}$ α-olefins; for example, $C_2$, $C_4$, $C_6$ and $C_8$ α-olefins.

The second propylene/ethylene copolymer comprises from 1 to 40 wt % ethylene comonomer. All individual values and subranges from 1 to 40 wt % are included and disclosed herein; for example, the comonomer content can be from a lower limit of 1, 3, 4, 5, 7 or 9, wt % to an upper limit of 40, 35, 30, 27, 20, 15, 12 or 9, wt %. For example, the second propylene/ethylene copolymer comprises from 1 to 35 wt %, or, in alternative, from 1 to 30 wt %, or 3 to 27 wt %, or 3 to 20 wt %, or from 3 to 15 wt %, of ethylene comonomer.

The second propylene/ethylene copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

In an embodiment, the second propylene/ethylene copolymer is a nonmetallocene, metal-centered, heteroaryl ligand catalyzed-propylene/ethylene copolymer. Such second propylene/ethylene copolymer is further described in U.S. Pat. No. 6,960,635 and U.S. Pat. No. 6,525,157, incorporated herein by reference. Such second propylene/ethylene copolymer is commercially available from The Dow Chemical Company, under the tradename VERSIFY, or from ExxonMobil Chemical Company, under the tradename VISTAMAXX.

In an embodiment, the second propylene/ethylene copolymer is further characterized as comprising (A) between 60 and less than 100, between 80 and 99, and more preferably between 85 and 99, wt % units derived from propylene, and (B) between greater than zero and 40, preferably between 1 and 20, 4 and 16, and even more preferably between 4 and 15, wt % units derived from ethylene and optionally one or more $C_{4-10}$ α-olefin; and containing an average of at least 0.001, at least 0.005 and more preferably at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ethylene copolymer interpolymer does not exceed 3 long chain branches/1000 total carbons.

In an embodiment, the second propylene/ethylene copolymer has one, some, or all of the following properties:
  a density from 0.86 g/cc to 0.89 g/cc;
  a melt flow rate from 1 g/10 min to 25 g10/min measured in accordance with ASTM D-1238 (at 230° C./2.16 Kg);

a melting temperature (Tmpeak in DSC) from 55° C. to 116° C.; and a molecular weight distribution (MWD) from 1.8 to 3.0.

A nonlimiting example of a suitable second propylene/ethylene copolymer is 2300 commercially available from The Dow Chemical Company, under the tradename VERSIFY™.

The second propylene/α-olefin copolymer may comprise two or more embodiments disclosed herein.

ii. Scorch Retardant

The cure component includes a scorch retardant. The term "scorch" is premature crosslinking during compounding and/or processing. Scorch occurs when the crosslinking agent undergoes thermal decomposition. This initiates a crosslinking reaction that may proceed in an uncontrolled manner and create gel particles in the mass of the thermoplastic material. Gel particles adversely impact the homogeneity of the crosslinked polymer. In addition, scorch results in high melt viscosities for the thermoplastic material which makes processing difficult and requires undesired increases in processing energy. Accordingly, "a scorch retardant" reduces, or eliminates, premature and/or uncontrolled crosslinking in the OBC.

Nonlimiting examples of suitable scorch retardant include 2,2,6,6-tetramethylpiperidinoxyl (TEMPO) and 4-hydroxy-2,2,6,6-tetramethylpiperidinoxyl (4-hydroxy-TEMPO) and combinations thereof.

In an embodiment, the scorch retardant is 4-hydroxyl-TEMPO.

iii. Crosslinking Agent

The cure component includes a crosslinking agent. The crosslinking agent bonds individual OBC polymer chains to each other. Bounded by no particular theory, it is believed the second propylene/α-olefin copolymer acts as a carrier for the cure component and prevents beta scission of the first propylene-based polymer during crosslinking of the OBC.

In an embodiment, the crosslinking agent is a peroxide. The peroxide can be a dialkyl peroxide. Nonlimiting examples of suitable dialkyl peroxide include: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3,2,5-dimethyl-2,5-di(t-amylperoxy)hexyne-3, di[(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy)butanol and mixtures thereof.

In an embodiment, the peroxide is 2,5 dimethyl 2,5-di-t-butylperoxy hexane. The cure component may optionally include a cure promoter. A suitable and nonlimiting cure promoter is triallyl isocyanurate (TAIC).

In an embodiment, the cure component includes from 78 to 99 wt % propylene/ethylene copolymer, from 0 wt % or greater than 0 wt % to 2 wt % scorch retardant, and from 1 to 20 wt % peroxide. Weight percent is based on total weight of the cure component.

D. Additives

The present composition may include one or more optional additives. Nonlimiting examples of suitable additives include antioxidant, extender oil (mineral oil or paraffin oil), filler (aluminum trihydrate, magnesium hydroxide), ultra-violet light stabilizer, and any combination thereof.

In an embodiment, the present composition includes
(A) from 5 wt %, or 14 wt % to 36 wt %, or 50 wt % of the first propylene-based polymer;
(B) from 15 wt %, or 27 wt %, or 35 wt % to 64 wt %, or 76 wt % OBC; (C) from 1 wt %, or 3 wt %, or 4 wt % to 18 wt %, or 25 wt %, or 36 wt % or 40 wt % second propylene/ethylene copolymer;
(D) from 0 wt %, or 0.01 wt %, or 0.05 wt % to 0.5 wt %, or 1 wt % scorch retardant; and
(E) from 0.25 wt %, or 0.1 wt %, or 0.5 wt % to 2.5 wt %, or 5.0 wt % crosslinking agent. Weight percent is based on total weight of the composition.

In an embodiment, the present composition includes components (A)-(E) set forth above with one, some, or all of the following additives:
(F) from 0 wt %, or greater than 0 wt %, or 0.1 wt %, or 0.5 wt % to 1 wt %, or 2 wt % antioxidant;
(G) from 0 wt %, or greater than 0 wt %, or 1 wt % to 33 wt %, or 50 wt % extender oil;
(H) from 0 wt %, or greater than 0 wt %, or 1 wt % to 33 wt %, or 50 wt % filler; and
(I) from 0 wt % or greater than 0 wt %, or 0.1 to 1 wt % UV stabilizer. Weight percent is based on total weight of the composition.

The present composition may comprise two or more embodiments disclosed herein.

2. Thermoplastic Vulcanizate

In an embodiment, the reaction mixture of the present composition produces a thermoplastic vulcanizate composition. The term "thermoplastic vulcanizate," (or "TPV"), as used herein, is a thermoplastic elastomer in which a cured elastomeric phase is dispersed in a thermoplastic material. The TPV composition includes at least one thermoplastic material and at least one cured (i.e., crosslinked) elastomeric material. The thermoplastic material forms a matrix, or a continuous phase, and the cured elastomer forms a discontinuous phase; that is, domains of the cured elastomer are dispersed in the thermoplastic matrix. In an embodiment, the domains of the cured elastomer are uniformly dispersed through the continuous phase of the thermoplastic material.

The present thermoplastic vulcanizate composition includes the first propylene-based polymer and crosslinked OBC. The first propylene-based polymer is the continuous phase of the thermoplastic vulcanizate. The crosslinked OBC is the discontinuous phase dispersed through the first propylene-based polymer.

The OBC is crosslinked by way of the cure component as discussed in detail below. In an embodiment, the thermoplastic vulcanizate composition also includes the second propylene/α-olefin copolymer.

The present TPV is prepared by melt mixing the OBC with the first propylene-based polymer and adding the cure component at a temperature to support crosslinking of the OBC. The TPV composition can be prepared by any suitable method for mixing polymers including mixing with a Banbury mixer. One or more optional additives may also be added during the mixing procedure.

In an embodiment, the cure component is a pre-blend (also referred to as a masterbatch). In other words, the cure component is prepared before adding the cure component to the OBC and the first propylene-based polymer. The cure component is made by melt mixing the second propylene/α-olefin copolymer at a temperature from 110° C. to 130° C. Once the second propylene/α-olefin copolymer is melted, the scorch retardant and crosslinking agent are added to the mixer. Mixing continues with heat from 1 to 5 minutes. The cure component pre-blend is then allowed to cool to ambient temperature and is then cut to small pieces.

In an embodiment, the present TPV composition is prepared by way of dynamic crosslinking. The term "dynamic crosslinking" is a process whereby a mixture of a crosslinking agent and polymer are masticated as crosslinking of the polymer occurs. The term "dynamic" indicates the mixture is subjected to shear forces during the crosslinking step. In contrast, "static crosslinking" is a process where the polymer is immobile (in fixed relative space) during the crosslinking procedure. An advantage of dynamic crosslinking is that thermoplastic elastomeric compositions may be obtained when the blend contains the proper proportions of propylene-based polymer and OBC, for example. Applicant discovered that the cure component advantageously yields homogeneous dynamic crosslinking and reduces, or eliminates, scorch during dynamic crosslinking.

In an embodiment, the first propylene-based polymer and the OBC are fed into a Haake internal mixer at a temperature from 170° C. to 180° C. and mixed until melted. The cure component (pre-blend) is subsequently added. The optional other additives may be added at this stage. The temperature is increased to 185° C. to initiate crosslinking of the OBC. The kneaders of the Haake mixer are rotated at a rate from 80 rpm to 90 rpm to dynamically vulcanize the mixture and crosslink the OBC. The mixed compound removed from the mixer is the thermoplastic vulcanizate composition.

During dynamic vulcanization, the second propylene/α-olefin copolymer advantageously acts as a carrier for the crosslinking agent and promotes homogeneous dynamic crosslinking. The second propylene/α-olefin copolymer also advantageously acts as a compatibilizer for the OBC and the first propylene-based polymer.

In an embodiment, the present TPV composition includes
from 5 wt % to 50 wt % of the first propylene-based polymer;
from 15 wt % to 76 wt % crosslinked OBC; and
from 1 wt % to 40 wt % of the second propylene/ethylene copolymer. Weight percent is based on total weight of the TPV composition.

In an embodiment, the TPV composition includes from 0 wt % or greater than 0 wt % to 50 wt % oil.

In an embodiment, the TPV composition is void of EPDM.

In an embodiment, the TPV composition is void of styrene.

In an embodiment, the TPV composition has a tensile strength from 4 MPa to 20 MPa.

In an embodiment, the TPV composition has an elongation at break from 200% to 900%.

The present TPV composition may comprise two or more embodiments disclosed herein.

3. Article

The present disclosure provides an article. The article includes the present TPV composition. Nonlimiting examples of suitable articles include foam, tires, hoses, belts, gaskets, synthetic corks, automotive applications (car/truck roofing, window seals, body seals, glazing seals), cap liner, gasket, sealant, extruded profiles, and molded parts.

DEFINITIONS

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomer.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "propylene-based polymer," as used herein, refers to a polymer that comprises, in polymerized form, a majority amount of propylene monomer (based on the weight of the polymer), and optionally may comprise one or more comonomer.

The term "propylene/ethylene copolymer," as used herein, refers to a polymer that comprises, in polymerized form, a majority amount of propylene monomer (based on the weight of the polymer), ethylene monomer, and optionally may comprise one or more additional monomer.

TEST METHODS

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™. 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Compression Set (for OBC)

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Tensile Set

Tensile set is measured according to ASTM D 412. The tensile bar is cut from a plaque with thickness of about 210.3 mm by Die C defined in ASTM D412. Tensile set test is performed according to ASTM D412. The tensile bar is kept in the environmental chamber (70° C.) of INSTRON for 10 minutes for preheating. Then the specimen is held at 100% elongation for another 10 minutes, released quickly without allowing it to snap back. The specimen is then allowed to rest for 10 minutes. At the end of the 10 minutes rest period, the distance is measured between the bench marks. Tensile set is calculated according to the equation below:

TensileSet=100[$L-L_0$]/$L_0$

L is equal to the distance between bench marks after the 10 minute retraction period.

CRYSTAF Standard Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hour and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

The term "crystallinity" refers to the regularity of the arrangement of atoms or molecules forming a crystal structure. Polymer crystallinity can be examined using DSC. Tme means the temperature at which the melting ends and Tmax means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 1410° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to 30° C. at a cooling rate of 10° C./min. The sample is kept isothermally at 30° C. for 2 minutes and heated to 30° C. at a heating rate of 10° C./min. The onset of melting is determined and checked to be within 0.5° C. from 0° C.

Samples of polymer are pressed into a thin film at a temperature of 190° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of about 30° C. above the polymer melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min. until melting is complete. The resulting enthalpy curves are analyzed for peak melt temperature, onset and peak crystallization temperatures, heat of fusion and heat of crystallization, Tme, Tmax, and any other quantity of interest from the corresponding thermograms as described in U.S. Pat. No. 5,960,635. The factor that is used to convert heat of fusion into nominal weight percent crystallinity is 165 J/g=100 wt % crystallinity. With this conversion factor, the total crystallinity of a propylene-based copolymer (units: weight percent crystallinity) is calculated as the heat of fusion divided by 165 J/g and multiplied by 100 percent.

Density is measured in accordance with ASTM D792.

DSC Standard Method

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.) 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Unless otherwise stated, melting point(s) ($T_m$) of each polymer is determined from the second heat curve obtained from DSC, as described above (peak Tm). The crystallization temperature ($T_c$) is measured from the first cooling curve (peak Tc).

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

The term "elongation %" as applied to foam is the linear extension which a sample of foam can attain before rupture. The foam is tested by the same method used to determine tensile strength, and the result is expressed as a percentage of the original length of the foam sample according to the procedures of ASTM D-3574, Test E.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.431 (M_{polystyrene})$.

Polyethylene equivalent molecular weight calculations are performed using Viscotek TriSEC software Version 3.0.

Melt flow rate, or MFR is measured in accordance with ASTM D 1238, Condition 230° C./2.16 kg.

Melt index, or MI, is measured in accordance with ASTM D 1238, Condition 190° C./2.16 kg.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm.times.12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Tensile Strength

Sheets for mechanical test are made by compression molding polymer pieces at 180° C. and a compression time of 10 minutes under the pressure of 10 MPa. Sheets are cut into bell-shape specimens using Die C. Tensile strength tests are carried out according to ASTM D412 at room temperature. The tensile speed is 50 mm/min.

TMA

Thermal Mechanical Analysis: Samples are compression molded into 1.8 mm thick films, then scanned at 5° C./min from 50° C. to 200° C. in a thermal mechanical analyzer (TMA Q400) at a load of 0.5 Newton.

Some embodiments of the present disclosure will now be described in detail in the following Examples.

EXAMPLES

1. Materials

Materials used in the examples section are provided in Table 1 below.

TABLE 1

| Component | Specification | Source |
|---|---|---|
| OBC 1 | ethylene-octene multi-block copolymer<br>density 0.866 g/cc<br>Tm 119° C.<br>MI 0.50 g/10 min<br>18 mol % octene in soft segment | Dow Chemical |
| OBC 2 | ethylene-octene multi-block copolymer<br>density 0.887 g/cc<br>Tm 119° C.<br>MI 5.0 g/10 min<br>18 mol % octene in soft segment | Dow Chemical |
| INSPIRE ™ C715-2 (PP) | Random propylene/ethylene copolymer<br>Density 0.90 g/cc<br>MFR 12.0 g/10 min | Dow Chemical |
| Luperox 101 peroxide | 2,5-bis(tert-butylperoxy)-2,5-dimethylhexane | Akema |
| VERSIFY ™ 2300 | Random propylene/ethylene copolymer<br>Density 0.866 g/cc<br>MFR 2.0 g/10 min<br>Crystallinity 13% | Dow Chemical |
| TAIC | Triallyl isocyanurate | Dow Chemical |
| 4-hydroxy-TEMPO | 4-hydroxyl-2,2,6,6-tetramethyl-1-piperidinyloxy | Dow Chemical |
| Irganox 1010 | Pentaerythritol tetrakis(3-(3,5-di-tert-butyl-4-hydroxyphenyl) propionate | Ciba |
| Irgfos168 | tris(2,4-di-tert-butylphenyl) phosphite | Ciba |
| Santoprene 201-64 | Thermoplastic vulcanizate (TPV)<br>Hardness, shore A 64<br>Density 0.97 g/cc | Advanced Elastomer System |
| Sunpar 2280 | Paraffin oil | Sunoco |
| Nordel IP4760 | EPDM | Dow Chemical |

2. Preparation of Cure Component

Preparation of pre-blend cure component—VERSIFY 2300 propylene/ethylene copolymer is fed into a 50 ml Haake internal mixer (from Thermo Co) at 120° C. After the VERSIFY 2300 propylene/ethylene copolymer melts, 4-hydroxyl-TEMPO and LUPEROX 101 are then fed into the mixer and mixed to about 2 minutes. The formant cure component (masterbatch) is removed from the Haake and allowed to cool to room temperature and is cut then into small pieces.

3. Reaction Mixture and Formation of TPV Composition

TPV composition preparation: OBC and propylene homopolymer are fed into a Haake internal mixer at 175° C. and mixed for 5 minutes. Then oil and other additive are charged in. Once the torque keeps consistent, the temperature is increased to 185° C., then the cure component (from above) is fed into the mixer. The rotation speed is 80 rpm. The mixed compound is removed from the mixer and cooled to room temperature. The formant TPV composition is cut into small pieces for molding and other tests.

4. Comparative Samples and Inventive Examples are Provided in Table 2 Below

TABLE 2

| Component (in grams) | Comp1 | Comp 2 | Comp 3 | Invent Ex 1 | Invent Ex 2 | Invent Ex 3 | Invent Ex 4 | Invent Ex 5 | Invent Ex 6 |
|---|---|---|---|---|---|---|---|---|---|
| Examples Formulation | | | | | | | | | |
| OBC 1 | 50 | | | | 29.53 | | 32.09 | 32.09 | 28 |
| OBC 2 | | | | 29.53 | | 32.09 | | | |
| IP4760 (EPDM) | | 21.8 | 18.5 | | | | | | |
| PP | | 6.18 | 9.5 | 15.9 | 15.9 | 17.28 | 17.28 | 17.28 | 14.9 |
| Luperox 101* | | | | | | 0.48 | 0.48 | 0.48 | |
| VERSIFY 2300MB* | | 5 | 5 | 4.43 | 4.43 | | | | 7 |
| Irganox 1010 | | | | 0.05 | 0.05 | 0.05 | 0.05 | 0.05 | |
| Irganox 168 | | | | 0.1 | 0.1 | 0.1 | 0.1 | 0.1 | |
| 4-Hydroxy-TEMPO | | | | | | | | 0.2 | |
| Sunpar2280 | | 15.9 | 15.9 | | | | | | |
| TAIC | | 1 | 1 | | | | | | |
| Santoprene 201-64 | | | | | | | | | |
| Mechanical Properties of Thermoplastic Vulcanizates | | | | | | | | | |
| Tensile Strength (Mpa) | 15.6 | 5.0 | 4.7 | 9.4 | 14.0 | 7.2 | 12.4 | 12.9 | 15.7 |
| Elongation (%) | 720 | 490 | 505 | 776 | 848 | 495 | 537 | 570 | 736 |

TABLE 2-continued

| | | | | | | | | |
|---|---|---|---|---|---|---|---|---|
| TMA (5° C./min, 5 g load, start point) (° C.) | 92 | | | 152 | 154 | 154 | 155 | 160 |
| Hardness, shore A | 64 | 64 | 70 | 88 | 88 | 85 | 88 | 90 | 88 |
| Tensile set at 70° C. | n/a | 13.3 | 13.2 | | 20.3 | | | | 24.7 |
| MI (g/10 min) 10 kg @190° C. | 0.5 (2.16 kg @190° C.) | 0.5 | 0.9 | 28.8 | 11.6 | 20.8 | 2.7 | 4.0 | 14.5 |

| Component (in grams) | Invent Ex 7 | Invent Ex 8 | Invent Ex 9 | Comp 4 | Invent Ex 10 | Invent Ex 11 | Invent Ex 12 |
|---|---|---|---|---|---|---|---|
| *Examples Formulation* | | | | | | | |
| OBC 1 | 25 | 35.1 | 17.6 | | 21.8 | 18.5 | 20 |
| OBC 2 | | | | | | | |
| IP4760 (EPDM) | | | | | | | |
| PP | 13 | 9.4 | 5 | | 6.18 | 9.5 | 8 |
| Luperox 101* | | | | | | | |
| VERSIFY 2300MB* | 6 | 5.7 | 5 | | 5 | 5 | 5 |
| Irganox 1010 | 0.04 | | | | | | |
| Irganox 168 | 0.08 | | | | | | |
| 4-Hydroxy-TEMPO | | | | | | | |
| Sunpar2280 | 6.33 | | 21.4 | | 15.9 | 15.9 | 15.9 |
| TAIC | | | 1 | | 1 | 1 | 1 |
| Santoprene 201-64 | | | | 50 | | | |
| *Mechanical Properties of Thermoplastic Vulcanizates* | | | | | | | |
| Tensile Strength (Mpa) | 7.3 | 10.9 | 4.7 | 5.9 | 5.4 | 5.4 | 4.9 |
| Elongation (%) | 625 | 485 | 468 | 312 | 625 | 473 | 478 |
| TMA (5° C./min, 5 g load, start point) (° C.) | | | | | | | |
| Hardness, shore A | 82 | 77 | 57 | 67 | 64 | 72 | 63 |
| Tensile set at 70° C. | 18.7 | 13.6 | 13.9 | 11.2 | 12.2 | 16.0 | 12.0 |
| MI (g/10 min) 10 kg @190° C. | 40.1 | N/A | 8.5 | 20.0 | 3.8 | 13.4 | 10.0 |

*Note:
cure component master batch contains 89 wt % VERSIFY 2300, 10 wt % peroxide (Luperox 101) and 1 wt % 4-hydroxy-TEMPO (based on total weight masterbatch)
Comp = Comparative Sample
Invent = Inventive Example

5. Discussion

As shown in Table 2, inventive Examples 1-9 are TPV compositions having dynamic crosslinked OBC without oil. Compared with pure OBC (OBC 1, comparative sample 1), all inventive examples 1-9 show good balance of mechanical property (tensile elongation greater than 400%) and flowability (MI greater than 10 g/10 min). At the same time, the heat resistance is improved significantly for inventive examples 1-9.

Comparative samples 2 and 3 are TPV samples having dynamic crosslinked EPDM (NORDEL 1P4760) as rubber phase (dispersed phase). Inventive examples 10-12 are TPVs having dynamic crosslinked OBC and are also oil filled. Comparing inventive examples 10-12 with comparative samples 2-3, inventive examples 10-12 an improved balance of mechanical properties and flowability.

Comparative example 4 is a commercial TPV sample (Santroprene 201-64 from AES, EXXONMOBIL). Comparing inventive examples 10-12 with comparative sample 4, it is seen that TPVs based on OBC resins achieve much better elongation, while other properties are comparable to the commercial TPV Santroprene 201-64.

In addition, inventive examples 1-9 and 10-12 also show that softness can be adjusted by changing the contents of oil and OBC, which affords broader design space.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A thermoplastic vulcanizate composition comprising:
   a polymeric composition consisting of a continuous phase, a discontinuous phase, and a compatibilizer;
   the continuous phase consisting of a first propylene-based polymer consisting of propylene and ethylene;
   the discontinuous phase dispersed in the continuous phase, the discontinuous phase consisting of a crosslinked ethylene/α-olefin multi-block copolymer consisting of ethylene and octene;
   the compatibilzer consisting of a second propylene-based polymer different than the first propylene-based polymer and consisting of propylene and ethylene;
   the polymeric composition consisting of
   from 5 wt % to 50 wt % of the first propylene-based polymer;
   from 15 wt % to 76 wt % of the crosslinked multi-block copolymer; and
   from 1 wt % to 40 wt % of the second propylene-based polymer that has a density that is different than the density of the first propylene-based polymer; and
   the thermoplastic vulcanizate composition is void of an ethylene-propylene-diene monomer rubber.

2. The thermoplastic vulcanizate composition of claim 1 having a tensile strength from 4 MPa to 20 MPa.

3. The thermoplastic vulcanizate composition of claim 1 having an elongation at break from 200% to 900%.

* * * * *